(12) United States Patent
Takeda

(10) Patent No.: US 9,013,971 B2
(45) Date of Patent: Apr. 21, 2015

(54) OPTICAL DISK DEVICE AND EQUALIZER ADJUSTMENT METHOD

(71) Applicant: Funai Electric Co., Ltd., Daito-shi, Osaka (JP)

(72) Inventor: Futoshi Takeda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/170,864

(22) Filed: Feb. 3, 2014

(65) Prior Publication Data

US 2014/0233364 A1 Aug. 21, 2014

(30) Foreign Application Priority Data

Feb. 20, 2013 (JP) ................................ 2013-030563

(51) Int. Cl.
*G11B 7/005* (2006.01)

(52) U.S. Cl.
CPC ...................................... *G11B 7/005* (2013.01)

(58) Field of Classification Search
None
See application file for complete search history.

(56) References Cited

U.S. PATENT DOCUMENTS

| | | | | |
|---|---|---|---|---|
| 4,763,205 A * | 8/1988 | Okano | ........................ | 386/207 |
| 4,866,404 A * | 9/1989 | Vandegraaf | ................... | 332/127 |
| 5,023,854 A * | 6/1991 | Satoh et al. | ................ | 369/30.12 |
| 5,623,474 A * | 4/1997 | Oshio et al. | ................ | 369/47.15 |
| 6,044,051 A * | 3/2000 | Miyagawa et al. | ........ | 369/47.19 |
| 6,809,998 B2 * | 10/2004 | Nagata | ....................... | 369/47.22 |
| 2003/0123364 A1 * | 7/2003 | Nakajima et al. | .......... | 369/59.22 |
| 2010/0232270 A1 * | 9/2010 | Nakamura et al. | ......... | 369/47.15 |
| 2013/0107690 A1 * | 5/2013 | Neo | ............................. | 369/53.2 |

FOREIGN PATENT DOCUMENTS

JP 2004-171616 A 6/2004

* cited by examiner

*Primary Examiner* — Peter Vincent Agustin
(74) *Attorney, Agent, or Firm* — Keating & Bennett, LLP

(57) ABSTRACT

An optical disk device includes an optical pickup that directs light beams onto a recording surface of an optical disk and receives reflected light, a signal generating unit that generates playback signals based on reflected light received by the optical pickup, an equalizer adjustment unit that performs equalizer adjustment of the playback signals, and an adjustment control unit. The adjustment control unit controls the equalizer adjustment unit so as to perform equalizer adjustment of the playback signals according to the playback signals based on reflected light from a management information area on a recording surface of the optical disk, the management information area including predetermined management information recorded thereon.

13 Claims, 6 Drawing Sheets

OPTICAL DISK DEVICE AND EQUALIZER ADJUSTMENT METHOD

BACKGROUND OF THE INVENTION

1. Field of the Invention

The present invention relates to an optical disk device which performs playback or recording of an optical disk and an equalizer adjustment method in an optical disk device.

2. Description of the Related Art

In recent years, optical disks such as CDs (compact discs) and DVDs (digital versatile discs) have become popular and have come into general use. Furthermore, optical disk devices have been put to practical use as devices for reading and then recording or playing back the information recorded on the optical disk, for example, audio information or image information. CD players, DVD players, CD-ROM drives connected to a personal computer, and the like are examples of widely known optical disk devices.

With an optical disk device, equalizer adjustment is performed to compensate for degradation of the signal waveform of RF signals, which are the playback signals for which information on the optical disk has been electrically read. Equalizer adjustment is performed by combining adjustment of both the cutoff frequency and burst volume for the RF signals.

With conventional optical disk devices, when the address is in an unrecorded state after tracking is on, equalizer adjustment was implemented so as to achieve the best jitter state in an embossed area or the like in which pits are formed in advance. As one example of an embossed area, a CDZ (control data zone) used with a DVD-R corresponds to this, for example.

However, normally with an embossed area, the pit forming method and physical characteristics are different from a recordable area (hereinafter referred to as "data area") in which it is possible for the optical disk device to perform recording. Therefore, the equalizer characteristics are also different for the embossed area and the data area. Because of this, there is a problem in that when the equalizer adjustment results for the embossed area are used with the data area, the jitter in the data area worsens, which worsens the read quality.

In relation to the above, Japanese Patent Application Laid-Open Publication No. 2004-171616 discloses an optical disk device in which equalizer adjustment is implemented with a plurality of areas on the optical disk, and the adjustment results are saved for each area, thereby setting the optimal value of each area.

However, when equalizer adjustment is performed for a plurality of areas as described above, and each adjustment value is recorded, there is a problem that the adjustment time increases significantly. Moreover, a recording medium for recording each adjustment value and a system for managing each of the recorded adjustment values are required.

SUMMARY OF THE INVENTION

Preferred embodiments of the present invention provide an optical disk device as well as an equalizer adjustment method with which it is possible to implement appropriate equalizer adjustment according to a recording state of an optical disk.

An optical disk device according to a preferred embodiment of the present invention includes an optical pickup arranged to direct light beams onto a recording surface of an optical disk and receives reflected light, a signal generating unit arranged to generate playback signals based on the received reflected light, an equalizer adjustment unit arranged to perform equalizer adjustment of the playback signals, and an adjustment control unit arranged and programmed to control the equalizer adjustment unit so as to perform the equalizer adjustment according to the playback signals based on reflected light from a management information area of the recording surface of the optical disk, the management information area including predetermined management information recorded thereon.

With this configuration, equalizer adjustment of the playback signals is performed according to the playback signals based on the reflected light from the management information area, so it is possible to implement appropriate equalizer adjustment according to the recording state of the optical disk.

It is preferable that the adjustment control unit is arranged and programmed to determine, based on recording quality of the management information area, whether or not implementation of the equalizer adjustment using the playback signals based on the reflected light from the management information area is appropriate, and if it is determined to be appropriate, then the adjustment control unit controls the equalizer adjustment unit so as to perform the equalizer adjustment using the playback signals based on the reflected light from the management information area.

This configuration makes it possible to avoid an inappropriate equalizer adjustment value being set due to poor recording quality of the management information area.

It is preferable that the adjustment control unit is arranged and programmed to determine, based on recording quality of the management information area, that the implementation of the equalizer adjustment using the playback signals based on the reflected light from the management information area is not appropriate, then the adjustment control unit controls the equalizer adjustment unit so as to perform the equalizer adjustment using a predetermined initial value, or controls the equalizer adjustment unit so as to perform the equalizer adjustment using the playback signals based on reflected light from an area on the recording surface of the optical disk in which pits are formed in advance.

With this configuration, it is possible to set an equalizer adjustment value that will be a substitute when the recording quality of the management information area is poor.

It is preferable that, if the management information is not recorded in the management information area during recording of the optical disk, then the adjustment control unit performs recording of the management information and controls the equalizer adjustment unit so as to perform the equalizer adjustment according to the playback signals based on the reflected light from the management information area following recording.

With this configuration, even if the management information is not recorded at the recording start time, it is possible to set an equalizer adjustment value appropriate for the recordable area.

It is preferable that the adjustment control unit uses a predetermined area contained in a lead-in area of the optical disk as the management information area.

This configuration makes it easier to specify the management information area.

It is preferable that, during spin-up of the optical disk or during recording of the optical disk, the adjustment control unit controls the equalizer adjustment unit so as to perform the equalizer adjustment according to the playback signals based on the reflected light from the management information area on which predetermined management information is recorded.

With this configuration, it is possible to set an equalizer adjustment value appropriate for the recordable area during spin-up or at the recording start time.

Furthermore, according to another preferred embodiment of the present invention, an equalizer adjustment method includes the steps of directing light beams onto a recording surface of an optical disk and receiving reflected light, generating playback signals based on received reflected light, and performing equalizer adjustment of the playback signals according to the playback signals based on reflected light from a management information area on the recording surface of the optical disk, the management information area including predetermined management information recorded thereon.

With this method, because equalizer adjustment of the playback signals is performed according to the playback signals based on the reflected light from the management information area, it is possible to implement appropriate equalizer adjustment according to a recording state of the optical disk.

Various preferred embodiments of the present invention make it possible to implement appropriate equalizer adjustment according to a recording state of an optical disk.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. Note that the preferred embodiments described herein are examples, and the present invention is in no way limited to the preferred embodiments described herein.

Figure 1:
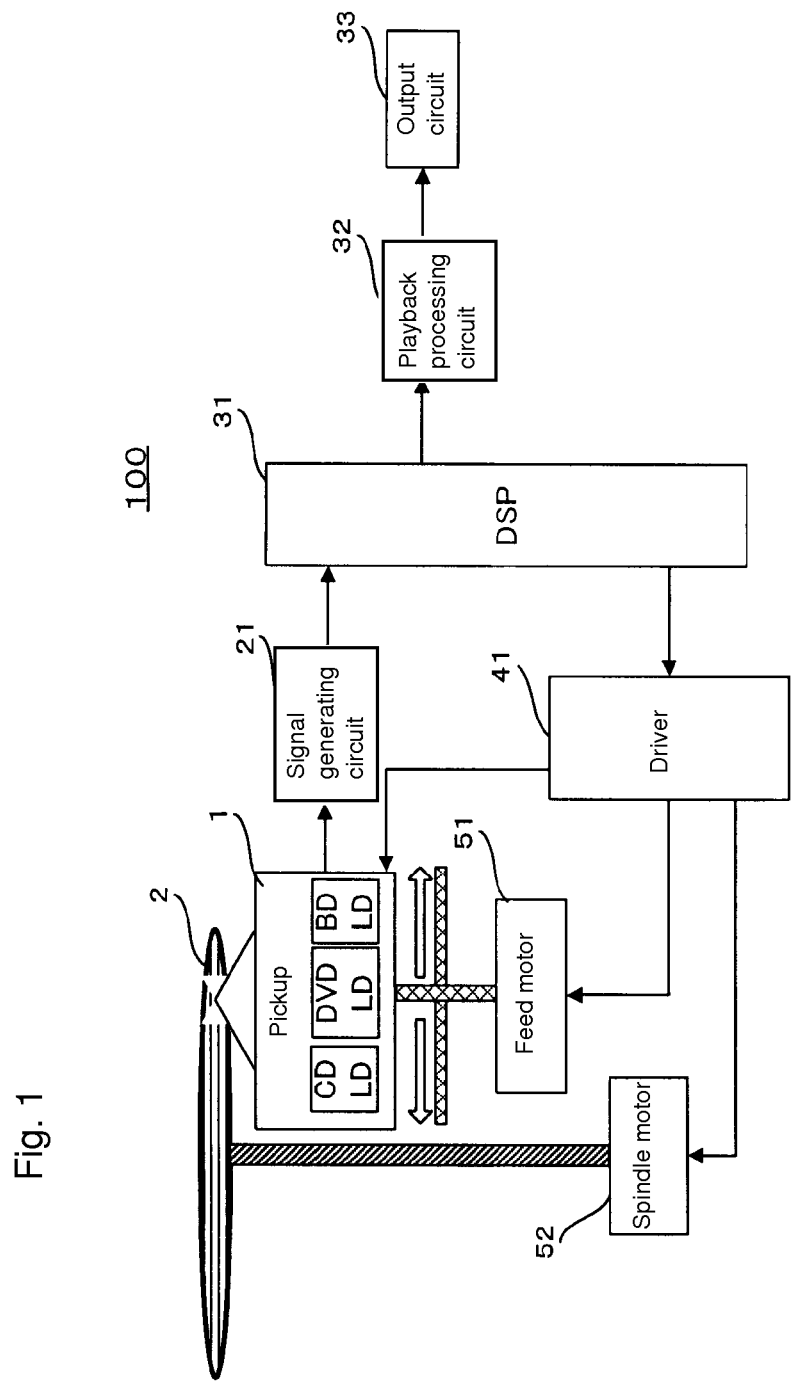
FIG. 1 is a block diagram showing the configuration of the optical disk device according to a preferred embodiment of the present invention.

FIG. 1 is a configuration diagram showing the DVD recorder 100 (i.e., optical disk device) according to a preferred embodiment of the present invention. The DVD recorder 100 includes an optical pickup 1, a signal generating circuit 21, a DSP (digital signal processor) 31, a playback processing circuit 32, an output circuit 33, a driver 41, a feed motor 51, and a spindle motor 52.

The optical pickup 1 directs light beams onto an optical disk 2 and performs reading and writing of audio information, image information, and the like on the optical disk 2. This optical pickup 1 is provided with light beams for CDs, light beams for DVDs, and light beams for BDs (Blu-ray Discs, registered trademark).

Inside the optical pickup 1, a light source, a dichroic prism, a collimating lens, an objective lens, a light detector, an actuator, and the like, for example, are included. The optical pickup 1 directs the light beams that are output from the light source onto the recording surface of the optical disk 2 using the objective lens or the like and performs photoelectric conversion of this reflected light using the light detector, so as to output electrical signals. Furthermore, the tracking operation, tilt operation, focus operation, and the like are performed by having the objective lens moved by the actuator.

The signal generating circuit 21 performs arithmetic processing based on the electrical signals obtained by the light detector included in the optical pickup 1 and generates various types of signals such as RF signals (i.e., playback signals), focus error signals (hereinafter referred to as "FE signals"), and tracking error signals (hereinafter referred to as "TE signals"). Then, the various types of signals thus generated are output to the DSP 31.

Figure 2:
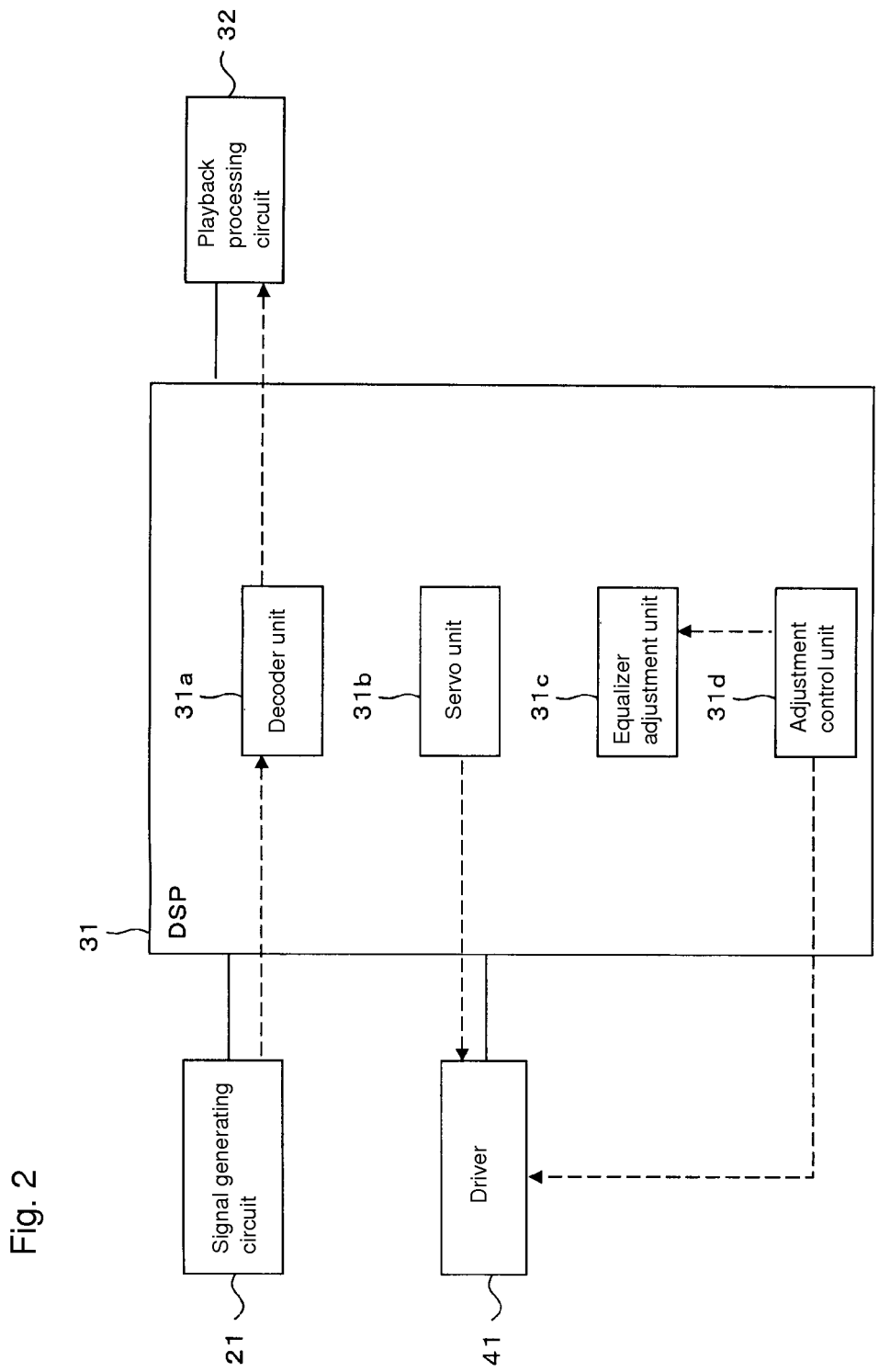
FIG. 2 is a block diagram showing the functional configuration of the optical disk device according to a preferred embodiment of the present invention.

The DSP 31 includes a plurality of functional units as shown in FIG. 2. Each functional unit preferably is realized by executing a designated program on the arithmetic processing device included in the DSP 31, for example.

A decoder unit 31a is programmed to generate image signals or audio signals by performing image processing or audio processing based on the RF signals that are input from the signal generating circuit 21 and supplies these signals to the playback processing circuit 32 which will be described later.

A servo unit 31b is programmed to generate servo signals based on the FE signals and TE signals that are input from the signal generating circuit 21. For example, the servo unit 31b generates the tracking servo signals to perform tracking servo or the focus servo signals to perform focus servo. The servo signals thus generated are supplied to the driver 41. By doing this, tracking control, focus control, or the like of the objective lens, for example, included in the optical pickup 1 is implemented.

An equalizer adjustment unit 31c is programmed to perform equalizer adjustment of the RF signals that are input from the signal generating circuit 21. The RF signals contain various types of frequency components, and the higher the frequency, the lower the level they are. However, when left at low level, the RF signal jitter becomes greater. Moreover, frequency components outside the necessary ones also lead to worsening of the jitter. In light of this, the equalizer adjustment unit 31c boosts the low level frequency components, cuts components of a certain frequency or greater, and adjusts the frequency characteristics of the RF signals such that the jitter is smaller.

When an address for which the optical pickup 1 had tracking on is in an unrecorded state, an adjustment control unit 31d checks the recording quality of a designated management information area provided in the data area. Then, if it determines that this is reliable recording quality, it controls the equalizer adjustment unit 31c such that equalizer adjustment is performed using RF signals based on the reflected light from this management information area.

Note that in the present preferred embodiment, as the management information area used for the determination, the RMA (recording management area) which is the area on which RMD (recording management data) is recorded is used. However, the management information area used for the determination is not limited to the RMA, and as long as it is an area on which management information is recorded within a data area, it is possible to change it as appropriate according to the type of optical disk or the like.

The playback processing circuit 32 performs D/A conversion processing to output image signals or audio signals to a monitor or the like (not illustrated). The signals obtained by the conversion process are output to an external device by the output circuit 33.

The driver 41 controls driving of the optical pickup 1, the feed motor 51, and the spindle motor 52 based on the control signals (servo signals, for example) supplied from the DSP 31. The feed motor 51 drives the optical pickup 1 in the radial direction of the optical disk 2. The spindle motor 52 drives the optical disk 2 in the direction of rotation.

Figure 5:
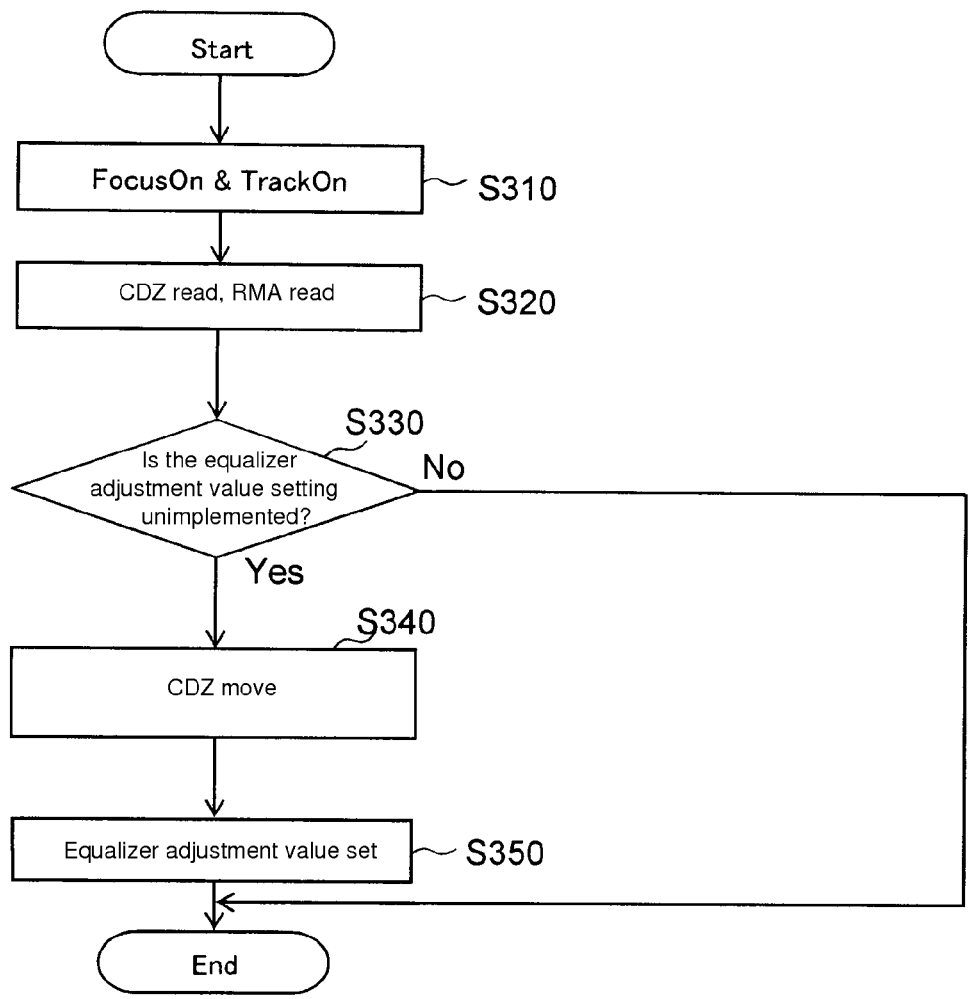
FIG. 5 is a flowchart showing the conventional process of setting the equalizer adjustment value during spin-up.

Next, a description will be given on the process of setting the equalizer adjustment value implemented by the optical disk device according to a preferred embodiment of the present invention. Here, an outline of a conventional process of setting the equalizer adjustment value will be described first while using the flowchart of FIG. 5. With the conventional equalizer adjustment value setting process, first, in Step S310, focus on and tracking on are performed, after which in Step S320, reading is performed with the CDZ and RMA as the subjects.

The CDZ is an embossed area in the innermost circumference area of the optical disk 2 and is formed during manufacturing of the optical disk 2. A manufacturer ID or the like is recorded in the CDZ. By reading this, it is possible to obtain the manufacturer name, the disk type, recommended recording strategies, and so forth.

The RMA is an area on which RMD is recorded and is provided on the inside of the lead-in area. The RMD is information including session information to manage the data recording state and information unique to the device that has performed recording on the optical disk such as the recording strategy.

Next, in Step S330, a determination is made as to whether or not setting of the equalizer adjustment value is unimplemented. If it has already been implemented, processing ends. If it is unimplemented, there is a move to the CDZ in Step S340. Then, after setting of the equalizer adjustment value in the CDZ is performed in Step S350, this process ends.

With the conventional process of setting the equalizer adjustment value, setting of the equalizer adjustment value is performed only in the CDZ. Then, this set equalizer adjustment value is also used for equalizer adjustment of RF signals based on the reflected light from the data area. However, the equalizer characteristics of both areas are not necessarily the same. This point will be described using FIG. 6 and FIG. 7.

Figure 6:
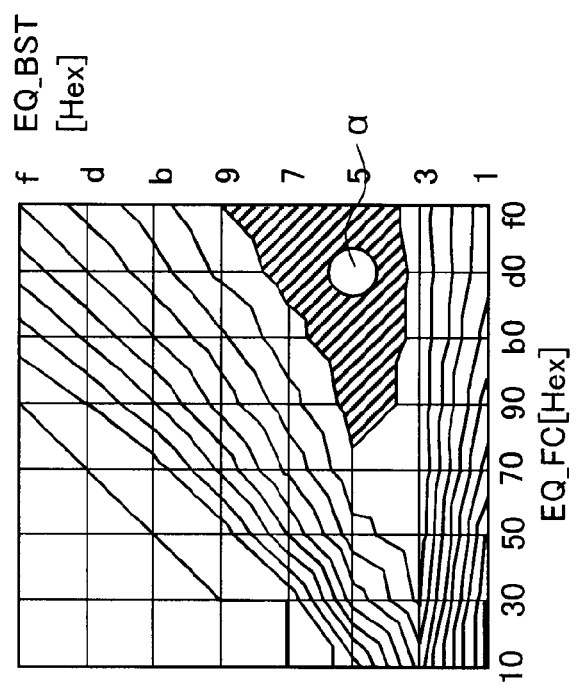
FIG. 6 is a model diagram showing the equalizer characteristics for the embossed area.

FIG. 6 is a coordinate plan view showing one example of the equalizer characteristics for the CDZ. In addition, FIG. is a coordinate plan view showing one example of equalizer characteristics for the data area. In both FIG. 6 and FIG. 7, the horizontal axis indicates the cutoff frequency, the vertical axis indicates the boost volume, and the contour line indicates the jitter volume.

Figure 7:
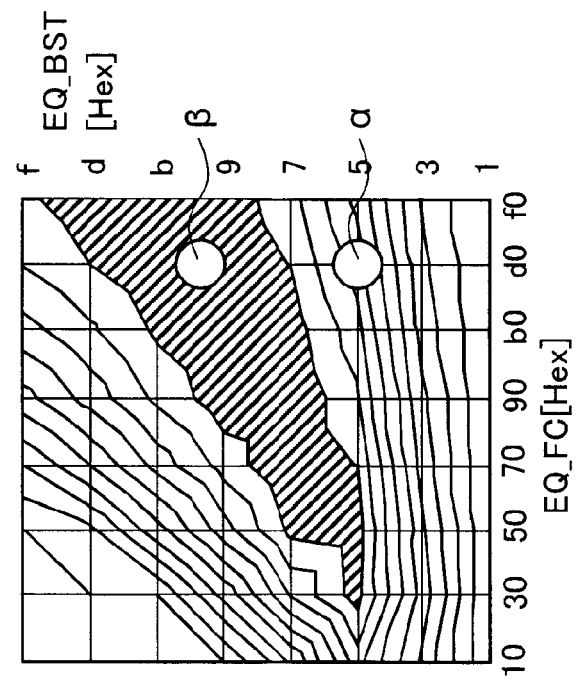
FIG. 7 is a model diagram showing the equalizer characteristics for the data area.

In FIG. 6 and FIG. 7, the areas shown with diagonal shading indicate the coordinate area with the smallest jitter volume. Furthermore, the circles α in FIG. 6 and FIG. 7 show the coordinates at which jitter is the smallest in the CDZ. Moreover, the circle β in FIG. 7 shows the coordinates at which the jitter is the smallest in the data area. The cutoff frequency for which the jitter is smallest in the CDZ and the data area is almost the same as shown by the respective circles, but the boost volume for which the jitter is the smallest differs. Therefore, when the equalizer adjustment results of the CDZ were applied to the data area, there was the problem that jitter worsened in the data area, and the read quality worsened.

In light of this, with the equalizer adjustment method according to a preferred embodiment of the present invention, equalizer adjustment of the RF signals is performed according to the RF signals based on the reflected light from the management information area. In more concrete terms, with the DVD-R unrecorded media, because of the standards thereof, RMA is invariably produced before recording the data area. In the present preferred embodiment, read quality is ensured by having RF signal equalizer adjustment performed according to the RF signals based on the reflected light from this RMA.

Figure 3:
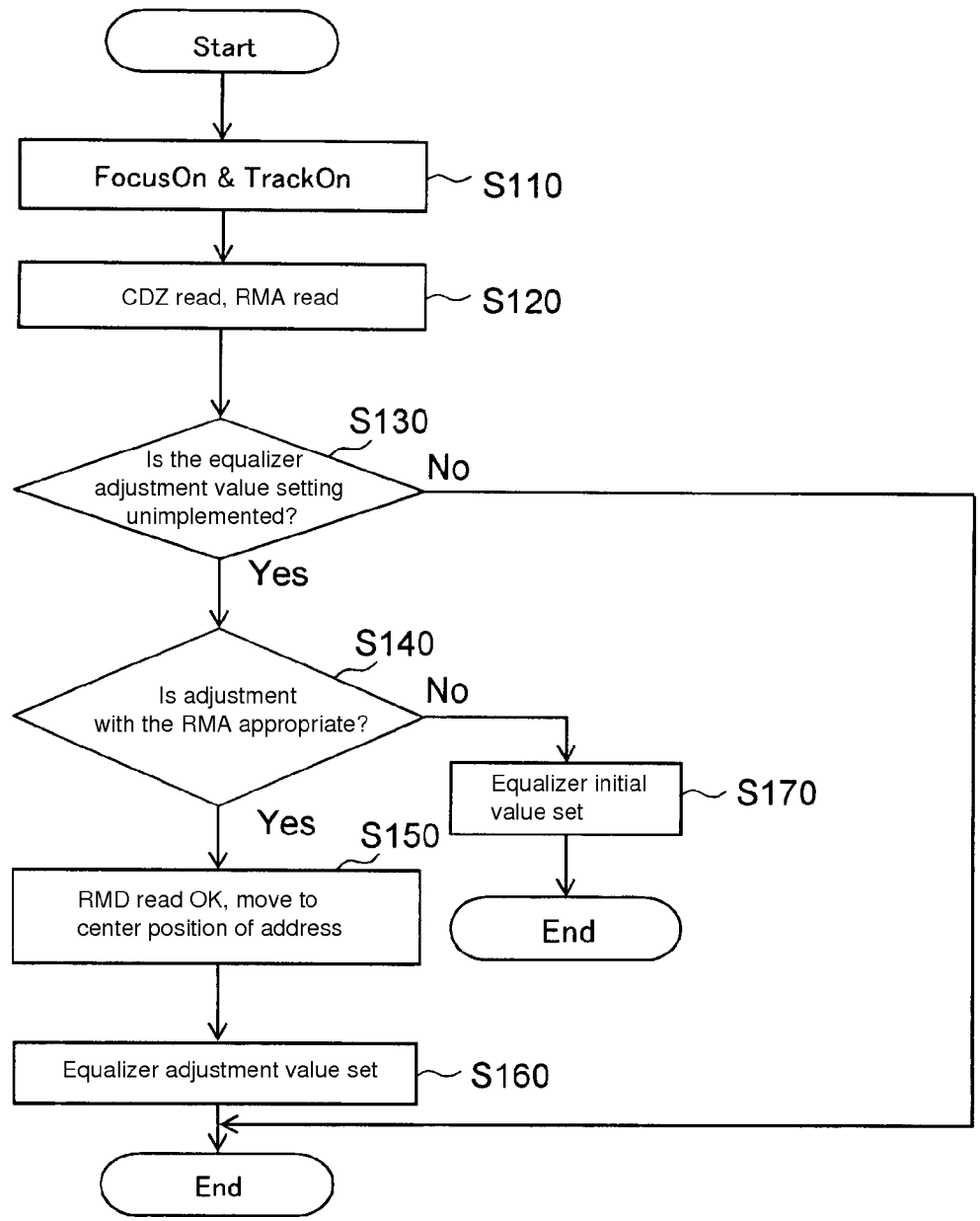
FIG. 3 is a flowchart showing the process of setting the equalizer adjustment value during spin-up.

The details of the process will be described using the flowchart of FIG. 3. FIG. 3 shows the process flow of the equalizer adjustment value setting process of a DVD-(minus) system, during DVD-R spin-up, for example.

First, in Step S110, the servo unit 31*b* performs focus on and tracking on for the optical disk 2 by performing focus control and tracking control of the optical pickup 1 via the driver 41.

Next, in Step S120, the adjustment control unit 31*d* implements reading of the CDZ and the RMA of the optical disk 2 by controlling the optical pickup 1 via the driver 41.

Next, in Step S130, the adjustment control unit 31*d* determines whether or not setting of the equalizer adjustment value is unimplemented. If it is not unimplemented, in other words, if it is already set, this process ends. On the other hand, if it is unimplemented, then in Step S140, the adjustment control unit 31*d* determines based on the recording quality of the RMA whether or not implementation of the equalizer adjustment using the RF signals based on the reflected light from the RMA is appropriate.

One concrete example of the determination method is a method by which when the conditions of (a) noted below are satisfied, the RMA recording quality is determined to be reliable, and it is determined that implementation of the equalizer adjustment using the RF signals based on the reflected light from the RMA is appropriate. In addition, the conditions of (a) noted below may be substituted with any of the conditions of (b) noted below, the conditions of (c) noted below, the conditions of (d) noted below, or the conditions of (e) noted below:

(a) An EDC (error detecting code) does not occur.
(b) The amplitude of the RF signals is a fixed value or greater.
(c) The modulation is a fixed value or greater.
(d) Beta is within a fixed range.
(e) The RF signal asymmetry is within a fixed range.

(a) is one type of error detection correction, and an error detecting code is used to detect data errors. The EDC occurs in cases where the relationship between the data and the error detecting code is not according to designated rules, and this indicates that there is an error for which correction is not possible. In cases where the EDC does not occur, on the other hand, this indicates a readable state.

Each of (b) through (e) is a determination method based on the waveform of the RF signals. Note that the modulation of (c) is the ratio of the RF signal maximum amplitude and the peak value. Furthermore, the beta of (d) is the ratio of the RF signal center point displacement and the maximum amplitude. Moreover, the asymmetry of (e) shows the vertical asymmetry of the RF signals.

If it is determined in Step S140 that implementation of the equalizer adjustment using the RF signals based on the reflected light from the RMA is not appropriate, then in Step S170, the adjustment control unit 31*d* sets the equalizer adjustment initial value which is prepared in advance according to the type of optical disk and ends the process.

On the other hand, if it is determined in Step S140 that implementation of the equalizer adjustment using the RF signals based on the reflected light from the RMA is appropriate, then in Step S150, the adjustment control unit 31d controls the optical pickup 1 so as to move the RMD to the center position of a readable address.

Next, in Step S160, the adjustment control unit 31d gives instructions to the equalizer adjustment unit 31c so as to implement setting of the equalizer adjustment value at the moved position described above. When setting of the equalizer adjustment value by the equalizer adjustment unit 31c is completed, this process ends.

Note that if it is determined in Step S140 that implementation of the equalizer adjustment using the RF signals based on the reflected light from the RMA is appropriate, or if the setting of the equalizer adjustment value fails in Step S160, then a mode is also possible in which the adjustment control unit 31d performs control such that a move is made to the CDZ, and the setting of the equalizer adjustment value is implemented at the CDZ.

Figure 4:
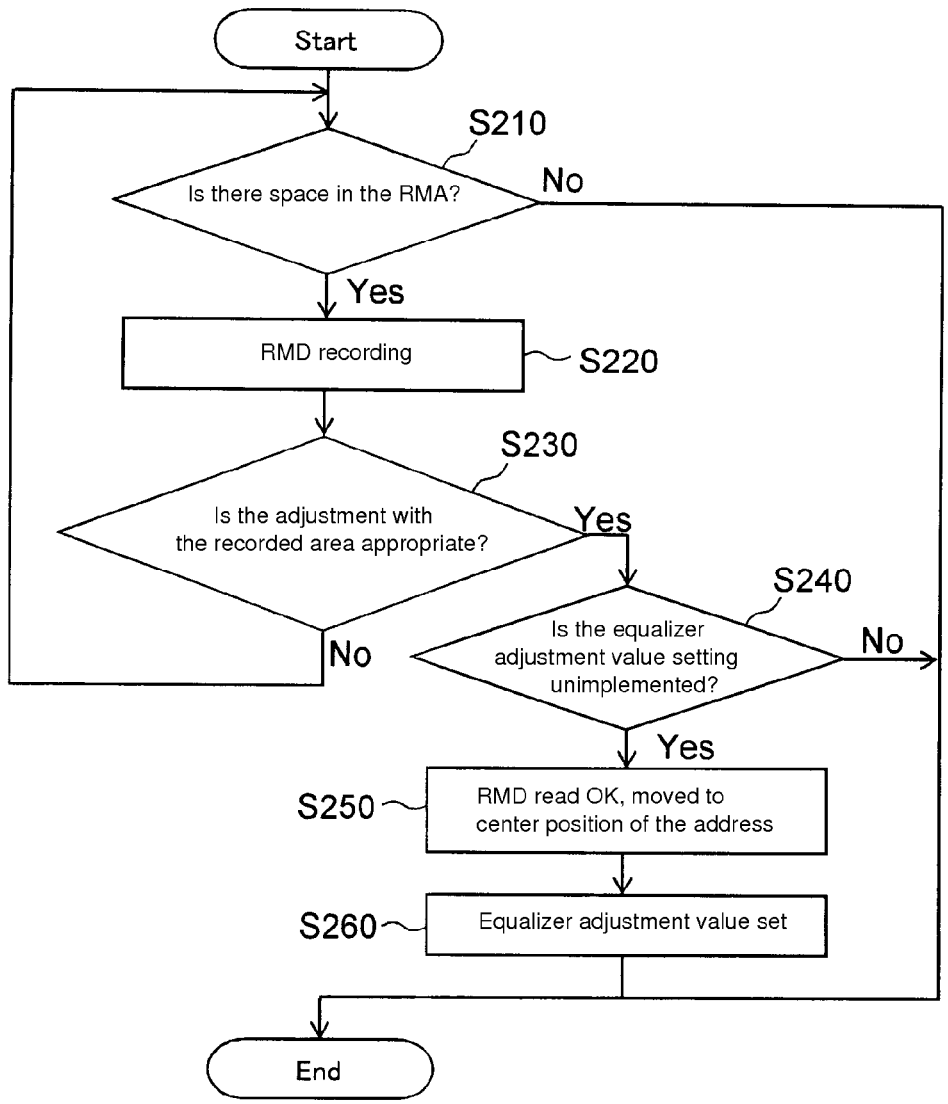
FIG. 4 is a flowchart showing the process of setting the equalizer adjustment value during data recording.

Next, FIG. 4 will be used to describe the process flow of the equalizer adjustment value setting process at the start of writing of the DVD-(minus) system.

First, in Step S210, the adjustment control unit 31d determines whether or not there is an open area in the RMA of the optical disk 2. If there is no open area in the RMA, this process ends. On the other hand, if there is an open area in the RMA, then in Step S220, the adjustment control unit 31d controls the optical pickup 1 so as to write the RMD to the open area of the RMA.

Next, in Step S230, the adjustment control unit 31d determines whether or not implementation of the equalizer adjustment using the RF signals based on the reflected light from the area in which the RMD is written as described above is appropriate based on the recording quality of the area in which the RMD is written as described above. Note that as a specific determination method, a method using the conditions of (a) through (e) or the like may be used, for example.

If it is determined that implementation of the equalizer adjustment using the RF signals based on the reflected light from the area in which the RMD is written as described above is inappropriate, the process moves to Step S210 again. On the other hand, if it is determined that implementation of the equalizer adjustment using the RF signals based on the reflected light from the area in which the RMD is written as described above is appropriate, then in Step S240, the adjustment control unit 31d determines whether or not the setting of the equalizer adjustment value is unimplemented.

If it is not unimplemented, i.e., if the setting is already done, this process ends. On the other hand, if it is unimplemented, then in Step S250, the adjustment control unit 31d controls the optical pickup 1 so as to move the RMD written as described above to the center position of a readable address.

Next, in Step S260, the adjustment control unit 31d gives instructions to the equalizer adjustment unit 31c so as to implement setting of the equalizer adjustment value at the moved position. When setting of the equalizer adjustment value by the equalizer adjustment unit 31c is completed, this process ends.

With the present preferred embodiment, even when the address following tracking on was in an unrecorded state, it is possible to perform appropriate setting of the equalizer adjustment value by utilizing the RMA and the RMD. Because of this, the playback performance is enhanced. In addition, it is not necessary to set the equalizer adjustment value for both the embossed area and the data area in advance or to record their individual adjustment values, either.

Note that the preferred embodiment described above used DVD-R media as the optical disk 2, for example, but a mode is also possible in which various preferred embodiments of the present invention are carried out by using a type of media other than this. However, because the management information and the configuration of the management information area differ depending the type of media, the management information and the management information area that are the subjects in each step may be changed as needed.

With DVD+R unrecorded media, for example, the standards dictate that an IDIZ (inner disc identification zone), which is the area on which a DCB (disk control block) is recorded, is always generated before recording onto the data area. Note that with the DCB as well, just as with the RMD, session information or the like is recorded. Because of this, when the equalizer adjustment process of various preferred embodiments of the present invention are implemented with DVD+R, processing is performed using an IDIZ instead of an RMA, and a DCB instead of an RMD. By doing this, it is possible to obtain the same actions and advantageous effects as those described above.

Other Preferred Embodiments

The present invention was described above by describing a preferred embodiment and a working example, but the present invention is not necessarily limited to the above preferred embodiment and working example and can be modified in a variety of ways and carried out within the scope of the technical concept thereof.

Accordingly, the present invention can also be applied to the modes described below.

With a preferred embodiment of the present invention, each functional unit related to the equalizer adjustment method of a preferred embodiment of the present invention preferably is realized by the DSP 31, but a mode is also possible in which some or all of these functional units are realized by a device other than this. For instance, it is also possible to have a mode in which these functional units are realized by using a plurality of circuits. Alternatively, it is also possible to have a mode in which these functional units are realized by executing a designated program on an arithmetic processing device such as a system controller (not illustrated).

With a preferred embodiment of the present invention, an example was shown of the DVD recorder 100 as the optical disk device to which the equalizer adjustment method of a preferred embodiment of the present invention is applied, but a mode is also possible in which the equalizer adjustment method of a preferred embodiment of the present invention is applied to an optical disk device other than this. For example, it is also possible to use a mode in which the equalizer adjustment method is applied to a CD player, a DVD player, an optical disk drive for a personal computer, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical disk device comprising:
   an optical pickup arranged to direct light beams onto a recording surface of an optical disk and receive reflected light;
   a signal generating unit arranged to generate playback signals based on received reflected light;

an equalizer adjustment unit arranged to perform equalizer adjustment of the playback signals to boost a low level frequency component and to cut a frequency component which is above a certain frequency; and an adjustment control unit arranged and programmed to control the equalizer adjustment unit so as to perform the equalizer adjustment according to the playback signals based on the reflected light from a management information area of the recording surface of the optical disk; wherein the adjustment control unit is arranged and programmed to determine based on the recording quality of the management information area whether or not implementation of the equalizer adjustment using the playback signals based on the reflected light from the management information area is appropriate, and if it is determined to not be appropriate, then the adjustment control unit controls the equalizer adjustment unit so as to perform the equalizer adjustment using a predetermined initial value, or controls the equalizer adjustment unit so as to perform the equalizer adjustment using the playback signals based on the reflected light from an area of the recording surface of the optical disk in which pits are formed in advance.

2. The optical disk device according to claim 1, wherein if the management information is not recorded in the management information area during recording of the optical disk, then the adjustment control unit performs recording of the management information and controls the equalizer adjustment unit so as to perform the equalizer adjustment according to the playback signals based on the reflected light from the management information area following recording.

3. The optical disk device according to claim 1, wherein the adjustment control unit uses a predetermined area contained in a lead-in area of the optical disk as the management information area.

4. The optical disk device according to claim 1, wherein during spin-up of the optical disk or during recording of the optical disk, the adjustment control unit controls the equalizer adjustment unit so as to perform the equalizer adjustment according to the playback signals based on the reflected light from the management information area on which the predetermined management information is recorded.

5. An optical disk device, comprising:
an optical pickup arranged to direct light beams onto a recording surface of an optical disk and receive reflected light;
a signal generating unit arranged to generate playback signals based on received reflected light;
an equalizer adjustment unit arranged to perform equalizer adjustment of the playback signals; and
an adjustment control unit arranged and programmed to control the equalizer adjustment unit so as to perform the equalizer adjustment according to the playback signals based on the reflected light from a management information area of the recording surface of the optical disk; wherein the adjustment control unit is arranged and programmed to determine based on the recording quality of the management information area whether or not implementation of the equalizer adjustment using the playback signals based on the reflected light from the management information area is appropriate, and if it is determined to be appropriate, then the adjustment control unit controls the equalizer adjustment unit so as to perform the equalizer adjustment using the playback signals based on the reflected light from the management information area.

6. The optical disk device according to claim 5, wherein, if the adjustment control unit determines based on the recording quality of the management information area that the implementation of the equalizer adjustment using the playback signals based on the reflected light from the management information area is not appropriate, then the adjustment control unit controls the equalizer adjustment unit so as to perform the equalizer adjustment using a predetermined initial value, or controls the equalizer adjustment unit so as to perform the equalizer adjustment using the playback signals based on the reflected light from an area of the recording surface of the optical disk in which pits are formed in advance.

7. The optical disk device according to claim 5, wherein if the management information is not recorded in the management information area during recording of the optical disk, then the adjustment control unit performs recording of the management information and controls the equalizer adjustment unit so as to perform the equalizer adjustment according to the playback signals based on the reflected light from the management information area following recording.

8. The optical disk device according to claim 5, wherein the adjustment control unit uses a predetermined area contained in a lead-in area of the optical disk as the management information area.

9. The optical disk device according to claim 5, wherein during spin-up of the optical disk or during recording of the optical disk, the adjustment control unit controls the equalizer adjustment unit so as to perform the equalizer adjustment according to the playback signals based on the reflected light from the management information area on which the predetermined management information is recorded.

10. The optical disk device according to claim 5, wherein the determination that the implementation of the equalizer adjustment using the playback signals is appropriate is made when an error detecting code does not occur.

11. The optical disk device according to claim 5, wherein the determination that the implementation of the equalizer adjustment using the playback signals is appropriate is made in accordance with any one of the following conditions:
(a) an error detecting code does not occur;
(b) an amplitude of the playback signals is at a predetermined value or greater;
(c) a modulation of the playback signals is at a predetermined value or greater;
(d) a beta of the playback signals, where the beta corresponds to a ratio of a center point displacement of the playback signals and a maximum amplitude of the playback signals, is within a predetermined fixed range; and
(e) an asymmetry of the playback signals is within a predetermined fixed range.

12. An equalizer adjustment method comprising the steps of:
directing light beams onto a recording surface of an optical disk and receiving reflected light;
generating playback signals based on received reflected light; and
performing equalizer adjustment of the playback signals according to the playback signals based on the reflected light from a management information area of the recording surface of the optical disk; wherein
the equalizer adjustment includes boosting a low level frequency component and cutting a frequency component which is above a certain frequency; and,
the equalizer adjustment further includes determining, based on recording quality of the management information area, whether or not performing of the equalizer adjustment using the playback signals based on the reflected light from the management information area is appropriate, and if it is determined to be appropriate, then the equalizer adjustment is performed using the playback signals based on the reflected light from the management information area.

13. The equalizer adjustment method of claim 12, wherein the equalizer adjustment further includes determining, based on recording quality of the management information area, whether or not performing of the equalizer adjustment using the playback signals based on the reflected light from the management information area is appropriate, and if it is determined to not be appropriate, then the equalizer adjustment is performed using a predetermined initial value, or the equalizer adjustment is performed to use the playback signals based on the reflected light from an area of the recording surface of the optical disk in which pits are formed in advance.

\* \* \* \* \*